United States Patent
Powers

(10) Patent No.: US 7,089,327 B1
(45) Date of Patent: Aug. 8, 2006

(54) SYSTEM AND METHOD FOR ROUTING INFORMATION TO MULTIPLE POINTS WITHIN AN EMBEDDED ENVIRONMENT

(75) Inventor: Manny Powers, San Diego, CA (US)

(73) Assignee: 3Com Corporation, Marlborough, MA (US)

( * ) Notice: Subject to any disclaimer, the term of this patent is extended or adjusted under 35 U.S.C. 154(b) by 769 days.

(21) Appl. No.: 09/863,509

(22) Filed: May 23, 2001

(51) Int. Cl.
*G06F 15/173* (2006.01)
*G06F 13/00* (2006.01)

(52) U.S. Cl. ............... 709/244; 709/230; 709/242; 370/359; 370/419; 710/316

(58) Field of Classification Search ........... 709/230, 709/250, 238, 242, 244; 710/316; 370/359, 370/419; 717/170, 173, 178
See application file for complete search history.

(56) References Cited

U.S. PATENT DOCUMENTS

| | | | | |
|---|---|---|---|---|
| 5,634,009 A | * | 5/1997 | Iddon et al. ............... | 709/223 |
| 5,742,762 A | * | 4/1998 | Scholl et al. ............... | 709/200 |
| 6,091,737 A | * | 7/2000 | Hong et al. ............... | 370/431 |
| 6,131,112 A | * | 10/2000 | Lewis et al. ............... | 709/207 |
| 6,151,390 A | * | 11/2000 | Volftsun et al. ............ | 379/229 |
| 6,317,743 B1 | * | 11/2001 | Heck ............................ | 707/10 |
| 6,332,198 B1 | * | 12/2001 | Simons et al. ................. | 714/6 |
| 6,453,456 B1 | * | 9/2002 | Price ............................ | 716/16 |
| 6,625,590 B1 | * | 9/2003 | Chen et al. ..................... | 707/1 |
| 6,886,107 B1 | * | 4/2005 | Walsh et al. .................... | 714/4 |

* cited by examiner

*Primary Examiner*—Saleh Najjar
*Assistant Examiner*—Michael Won
(74) *Attorney, Agent, or Firm*—McDonnell Boehnen Hulbert & Berghoff

(57) ABSTRACT

A system and method of processing commands receives and stores in a memory a first command line interface. The first command line interface processes commands addressed to boards of a first board type. The system and method receives and stores in memory a second command line interface. The second command line interface processes commands addressed to boards of the first board type. The system and method processes a first command using the first command line interface and a second command using the second command line interface. The first command and the second commands are addressed to boards having the first board type.

20 Claims, 6 Drawing Sheets

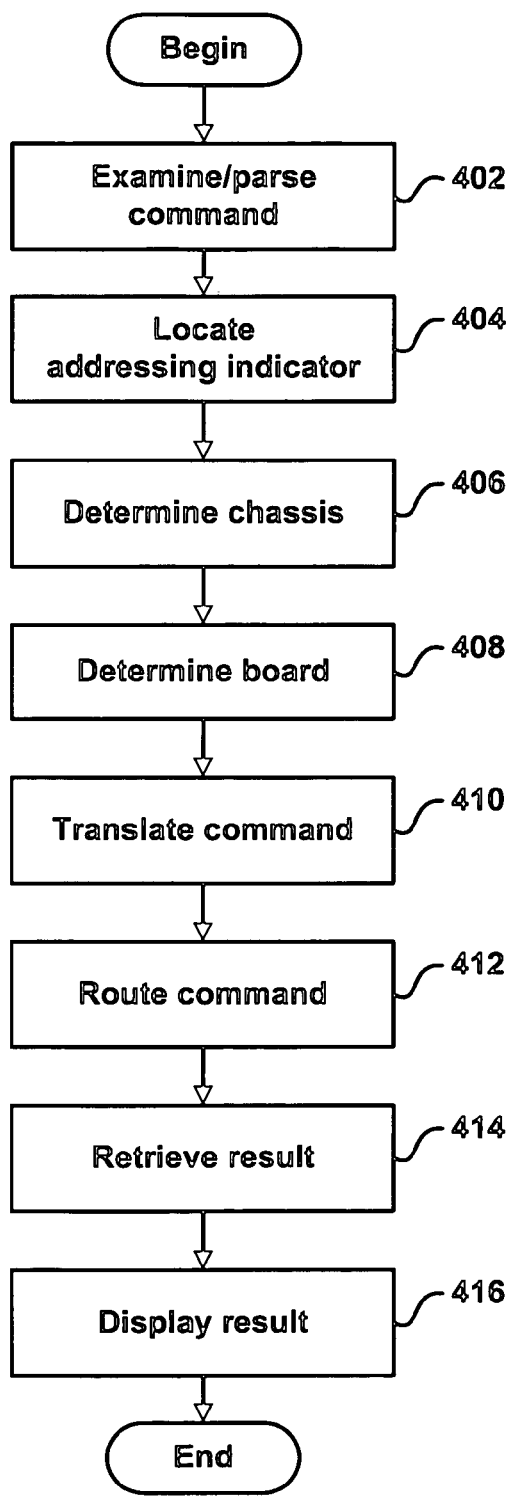

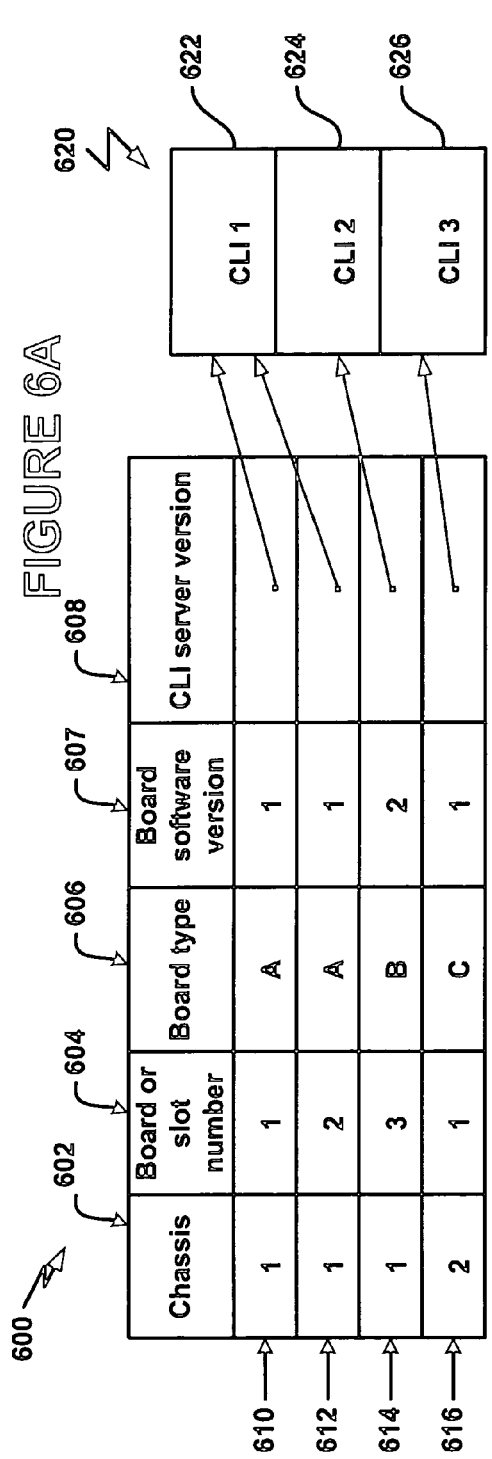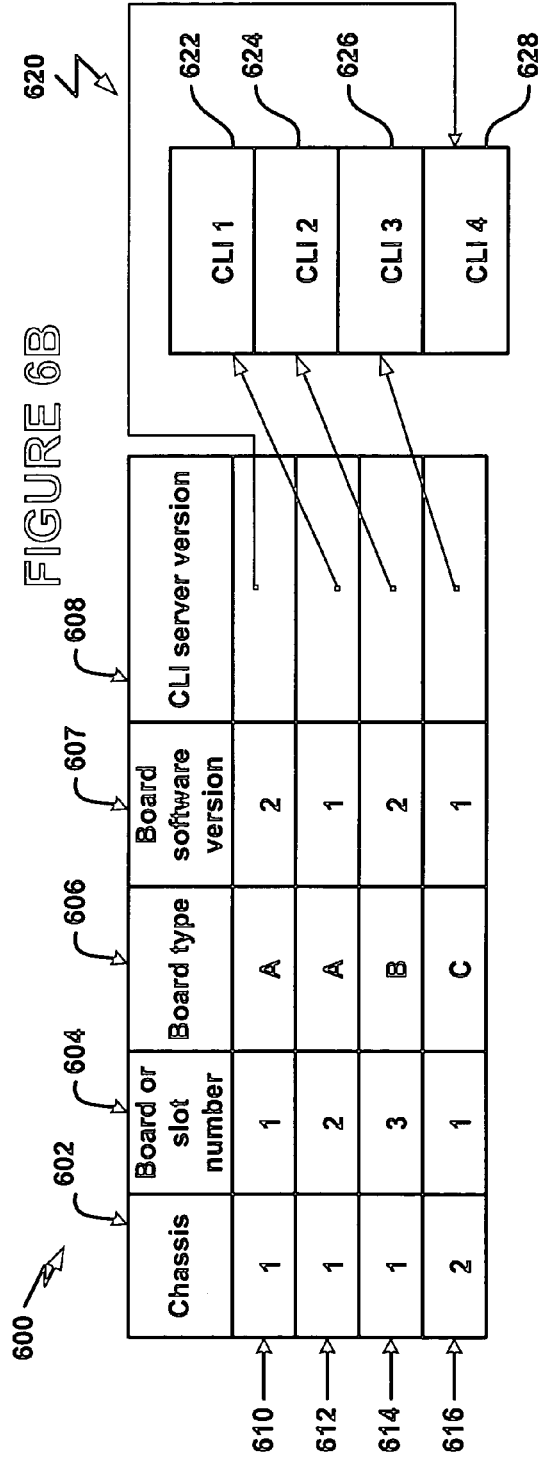

SYSTEM AND METHOD FOR ROUTING INFORMATION TO MULTIPLE POINTS WITHIN AN EMBEDDED ENVIRONMENT

FIELD OF THE INVENTION

This present invention relates to transmitting information to different entities in a system. More specifically, it relates to routing commands to different destinations within a computer system.

BACKGROUND OF THE INVENTION

In modern computer systems, processing functions are often performed by electronic boards. The boards themselves may be housed in a single or multiple chassis. The boards may be placed in slots in the chassis with each slot holding a different board. The boards may be differentiated based upon different criteria. For example, the boards may perform different types of processing (e.g., resource management) or provide different hardware elements (e.g., memories).

The boards may include software images, which are stored in a memory and used by a processor to perform processing on the board. The software images may, for example, include operating system software or application programming. The software images may operate with only certain types and versions of boards.

Over time, the software images on different boards may need to be updated. For example, a new software image for a particular board may operate faster or more efficiently. A newer software image may also provide new features for a board.

A network management station, communicatively coupled to a board, may be used to upload images to the boards. An operator may type in commands to update a software image. The network management station may utilize an interface that allows a user to enter the commands to be sent to the different boards. The interface may be the command line interface (CLI). The CLI itself may be comprised of a plurality of CLI servers. Each server may process commands destined for boards having a particular type and version number.

The boards may use different protocols to communicate with each other. For example, the file transfer protocol (FTP) or trivial file transfer protocol (TFTP) may be used. Another example of a protocol is the dynamic host configuration protocol (DHCP).

SUMMARY OF THE INVENTION

The system and method of the present invention advantageously allows a user to route commands to any board in a system having one or more chassis with one or more board in each chassis. Conveniently, the same command can be routed to different boards without user intervention. In addition, boards of the same type and version may be replaced sequentially without all boards of the same type and version being deactivated.

In one embodiment of the present invention, a device includes a memory and a processor.

The memory may receive and store a first command line interface. The first command line interface may process commands addressed to boards of a first board type. The memory may also receive and store a second command line interface. The second command line interface may process commands addressed to boards of the first board type.

The processor may process a first command using the first command line interface and a second command using the second command line interface. The first command and the second commands may be addressed to boards having the first board type. The processor may also receive commands addressed to multiple boards and routes the commands to the multiple destinations.

In another example of the present invention, a system for downloading a software image includes a plurality of boards, a network management station, and a system manager. Each of the boards may have a slot number and a chassis number. The network management station may have an interface, the interface allowing an operator to enter a command. The command may have a destination slot number and destination chassis number.

The system manager coupled to the network management station and to the plurality of boards. The system manager may store a plurality of command line interfaces. Each of the command line interfaces may process commands addressed to boards having a board type and a version number.

The system manager may determine the destination slot number and chassis number of the command. The command line interface associated with the slot number and the chassis number may process the command. One of the plurality of boards may be updated with a new image and a new command line interface. Thereafter, a command having a destination of the slot number and chassis number of the board may be routed to the new command line interface. Commands addressed to others of the plurality of boards of the same board type as the one of the plurality of boards may be routed to other of the command line interfaces.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein:

FIG. 4 is a flowchart showing the routing of a CLI command in accordance with a preferred embodiment of the present invention;

FIGS. 6a and b are block diagrams showing the effects of adding a CLI in accordance with a preferred embodiment of the present invention.

DETAILED DESCRIPTION OF PREFERRED EMBODIMENTS

Figure 1:
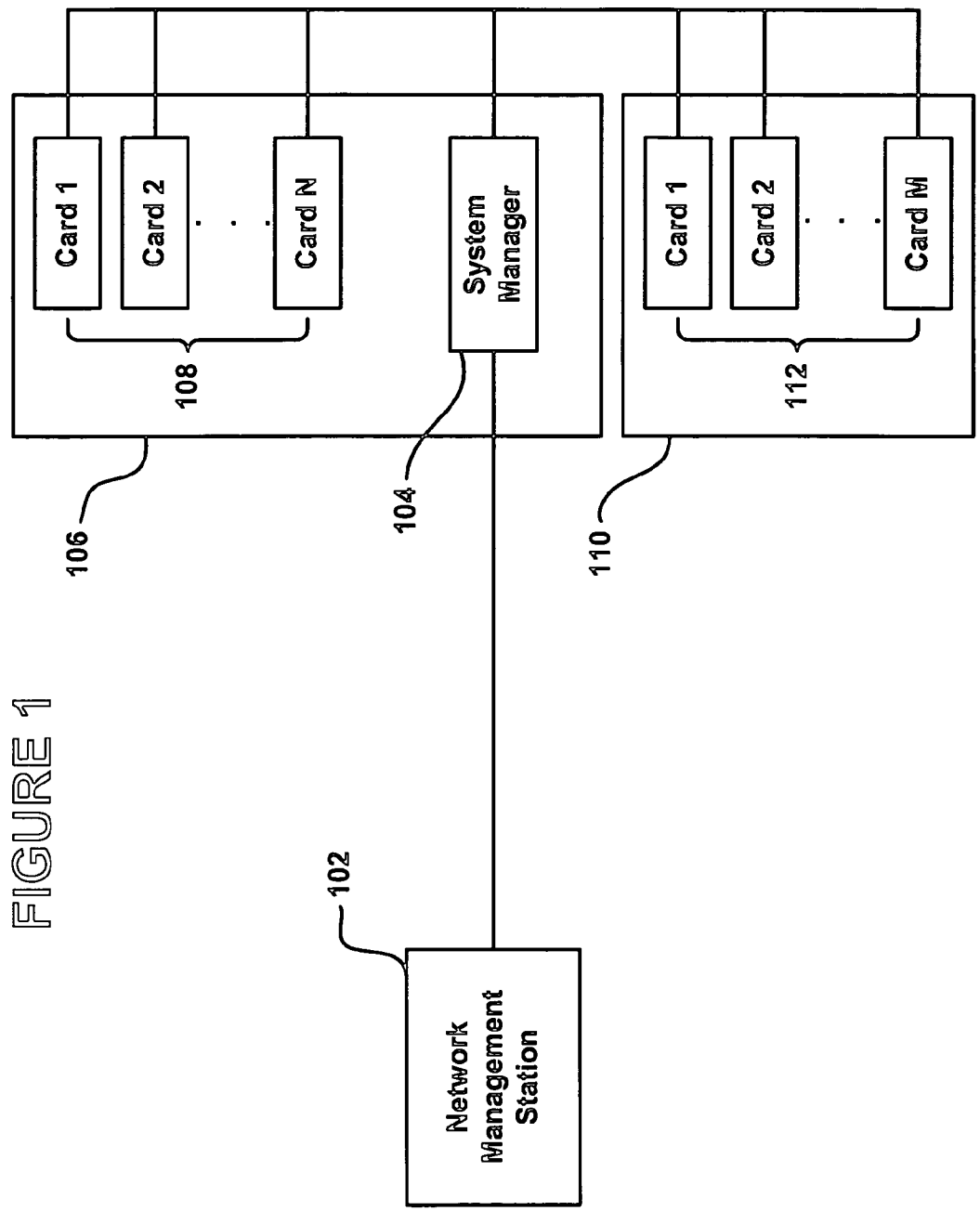
FIG. 1 is a diagram illustrating a preferred embodiment of the system for the system in accordance with the present invention.

Referring now to FIG. 1, a network management station (NMS) 102 is coupled to a system manager 104. The system manager 104 is coupled to a first chassis 106. The first chassis 106 includes a group of n boards 108. The system manager 104 may be a card in the group of 108 and is also coupled to a second chassis 110. The second chassis 110 includes a group of m boards 112. It should be understood that many of the elements described and illustrated throughout this specification are functional in nature and may be embodied in one or more physical entities or may take other forms beyond those described or depicted.

The NMS 102 may be implemented by a processor executing computer instructions stored in a memory. The NMS 102 may perform a variety of functions. For example, the NMS 102 may query any of the boards 108 to determine parameters of the boards. The boards 108 may return the parameters to the NMS 102. Once the NMS 102 receives the parameters from one the boards 108, the NMS 102 may determine information from the returned parameters. For example, the NMS 102 may determine whether one of the boards 108 requires attention. One example of an NMS is the Total Control Manager® manufactured by 3Com Corporation.

The system manager 104 may be implemented by a processor executing computer instructions stored in a memory. The system manager 104 may receive images from the NMS 102. The images may include a CLI executable code ("a CLI server") that processes CLI commands addressed to certain board types and certain versions of boards. The system manager 104 may keep part of the images containing the CLI code for a particular board and for every version of that board. In addition, the CLI server may include a parser, which determines whether a command is syntactically correct. Further, the parser may determine if a request for help exists in the command, and, if so, displaying help information in response to the request. Although the parser is shown as being part of the system manager, it will be understood that the parser may be positioned in other locations as well.

The groups of boards 108 and 112 are groups of n and m boards ("blades"), respectively, that can perform any type of function. For example, the any of the groups of boards 108 and 112 may be HiperArc boards manufactured by 3Com Corporation. The boards may be coupled to a variety of devices and/or networks. For example, the boards may be coupled to a telephone network or the Internet. The boards may be coupled to other networks or entities as well.

In one example of the operation of the system of FIG. 1, an image may be downloaded from the NMS 102 to system manager 104. The image may include executable code that a board uses to activate the electronic hardware on the board. The images may be downloaded when the system is booted up.

The image may contain sub-portions. One of the sub-portions for every image may be the CLI server for a particular board type having a particular version. The sub-portions, including the CLI servers, may be stored in a memory at the system manager 104. The remaining parts may distribute to the correct boards by the system manager 104.

CLI commands may be entered by an operator the NMS 102. The commands may be forwarded from the NMS 102 to the system manager 104. The system manager 104 may determine the destination board for the command and direct the command to the CLI for that board. The CLI for that board may process the command, for example, performing translation functions.

In one example, a command of "set 1:3 system.setup address=xyz" may be routed by the NMS 102 to the system manager 104. The System Manager 104 (with a Master CLI Server having the boardtype and version of every chassis and slot) may see the destination of chassis 1, slot 3. The appropriate CLI Server for the boardtype and version contained in chassis 1, slot 3 may perform the appropriate parsing/translation of the command, and forward the command to the correct board. The CLI Server for the boardtype and version contained in chassis 1, slot 3 may then receive a response, for instance, a response message, from the board and forward it to the Master CLI Server who may then respond to the user.

The software image for a board may need to be updated. This may occur when a board is replaced or new features are to be added to the board. When the image for a board is updated, a new CLI server may be transmitted to the system manager. The new CLI server processes commands sent to the new version of the board. The remaining portions of the image (not including the CLI server) may be downloaded to the board. In this situation, there may exist two CLI servers for boards of the same type with different software versions. Since two CLI servers for a board type exist, both versions will then be able to be executed at the same time. Thus, the CLI server used to process commands for other boards of the same type may be adjusted some time later, until all commands destined for boards of the same type and version are processed by the same CLI server and only one version of the CLI server exists at the system manager for all boards of the same boardtype and software version.

Figure 2A:
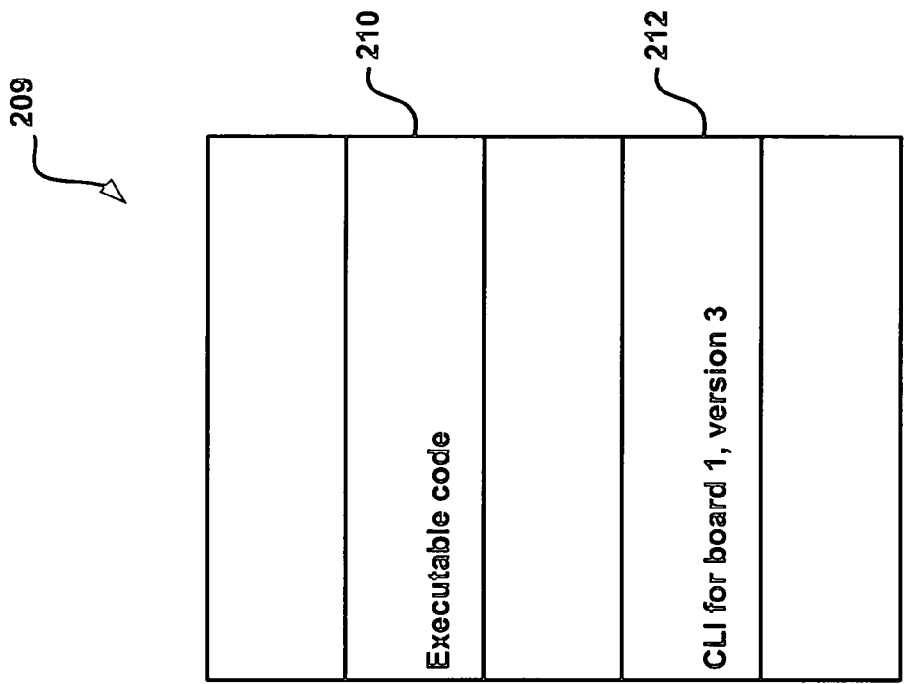
FIGS. 2a and b memory diagrams in accordance with a preferred embodiment of the present invention.
Figure 2B:
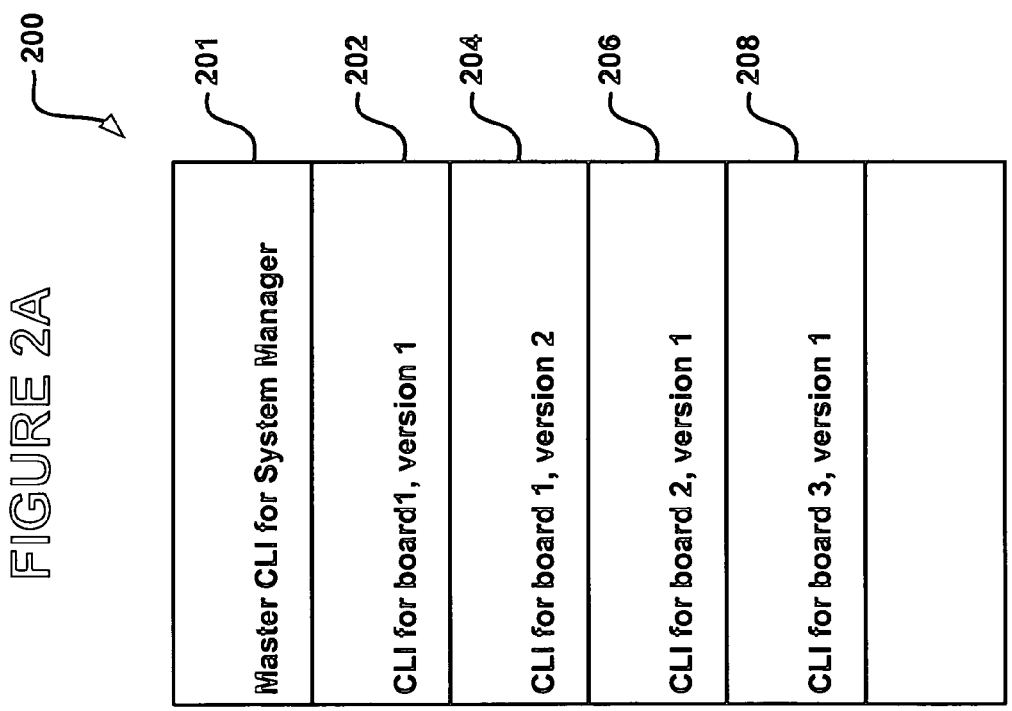

FIG. 2a shows how each of the separate CLI Servers may be executed and running on the System Manager 104. FIG. 2b is how a complete image may be transferred to the System Manager 104. The binary image the board needs to boot (210) may be sent to the board and the binary image needed to support the CLI boardtype and version (212) is kept at the System Manager 104. FIG. 2a then shows how a series of image transfers may result in a number of CLI Servers 202, 204, 206, 208 residing on the System Manager 104. There exists a Master CLI Server 201 that attaches all the other CLI Servers 202, 204, 206, 208 into a cohesive CLI.

Referring now to FIG. 2a, one example of an image 200 includes executable code fields 202, 204, 206, and 208. The field 202 includes the CLI executable code ("a CLI server") for board type 1, version 1. The field 204 includes the CLI server for board type 1, version 2. The field 206 includes the CLI server for board type 2, version 1. The field 208 includes the CLI server for board 3, version 1. The image 200 may include any number of sets of CLI server for any number of board types and any number of these board types.

The image may include other fields as well. For example, fields may exist for HTTP Servers of differing boardtypes and versions.

Referring now to FIG. 2b, an example of an image 209 includes a first section 210. The first section includes executable code for a particular board type. A second section 212 includes CLI executable code ("the CLI server") for board type 1, version 3. The image may include other fields as well. For example, fields may exist for HTTP Servers, having differing boardtypes and versions.

Figures 3, 5:
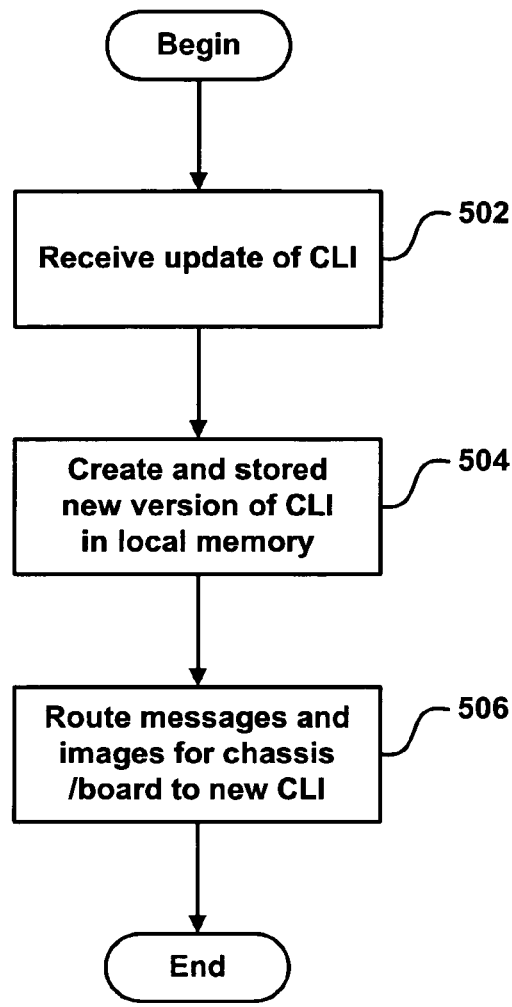
FIG. 3 is a CLI command in accordance with a preferred embodiment of the present invention.
FIG. 5 is a flowchart showing the addition of a CLI in accordance with a preferred embodiment of the present invention.

Referring now to FIG. 3, one example of a command 300 may include a command field 302, a destination field 304, a topic field 306, and a parameter field 308. The command 300 may be a CLI command. However, other types of commands in different formats are also possible. For example, the other commands may include HTTP requests.

The command field 302 may include any type of command, for example, "set." The destination field may include any type of indication of the ultimate destination of the command including the chassis and the slot number in the chassis. In one example, the destination field 304 may be set to "1:3" where 1 indicates the chassis number and 3 indicates the slot number in the chassis where the command is destined. Other type of indications are possible. A range is also possible. For example: 1,3:5–9 where 1 and 3 are chassis and 5–9 are slots 5 to 9 inclusive.

The topic field 306 includes a single command or series of command indicating information needed to complete the command. In one example, the topic fields may be set to "system.setup". Other examples are possible.

The parameter field 308 may include any parameters that are needed to complete the command. In one example, the parameter field 308 may be set to "address=xyz," where "address" is the parameter indicator and "xyx" is the value the parameter is being set to. Other examples are possible.

Referring now to FIG. 4, one example of a method of routing a CLI command to a particular chassis and a board within the chassis is described. At step 402, the system may receive the command, examine the command, and parse the command. For example, a parser may read the command to find the symbols in the command, a lexical analysis may be undertaken to determine a set of tokens, and an abstract syntax tree may be created, which captures the structural form of the command.

At step 404, the system may locate the address indicator in the message. For example, the address indicator may be "1:3" where 1 is the chassis number and 3 is the slot number within the chassis for the destination of the message. The address indicator may take other forms as well.

At step 406, the system may determine the chassis number of the destination from the addressing indictor. For example, if the addressing indicator is "1:3:, then the system may determine that the chassis is chassis 1. Other methods of addressing the chassis may also be used including ranges for the chassis. A comma may be used to distinguish separate chassis and a dash may be used to include a set of chassis.

At step 408, the system may determine the board number from the addressing indicator. For example, if the addressing indicator is "1:3", the system may determine that the board number within the chassis is board 3. Other methods of addressing a particular board within a chassis may also be used including ranges for the boards. A comma may be used to distinguish separate slots and a dash may be used to include a set of slots.

At step 410, the system may translate the command from one protocol to another protocol. For example, the system may translate the command from the CLI command format to the SNMP protocol. Other types of translation are possible, for example, from HTTP to SNMP.

At step 412, the system may route the command to the proper board. For example, if the command has a Destination of board 3 in chassis 1, then the system routes the command to board 3 in chassis 1. The command may be routed to the board using any type of protocol, for example, using the SNMP protocol. Other examples of protocols may be used.

At step 414, the system may retrieve a result from the board that gets translated back to the original protocol. For example, the board may reply with an SNMP result and the CLI Server may convert that to a CLI message response.

At step 416, the system may display the result to the user to show the appropriate action was taken by the board. For example, the CLI message could respond with "success" or "error".

Referring now to FIG. 5, one example of updating boards in a chassis is described. At step 502, the system receives an update request. The request may be to update a particular board in a particular chassis. Alternatively, the request may be to update several boards in the same chassis or several boards in different chassis. The update may be in the form of a CLI command, for example, with an image of executable code.

At step 504, the system creates a new version of the CLI server in a memory. The memory may be anywhere in the system. The CLI server present in the image may be placed in memory. Thereafter, commands destined for the chassis and slot use the new CLI server that has just been loaded.

At step 506, messages with destinations of the slot number and the board number are routed to the new CLI server. If the board in the chassis and slot number is of the same type as that housed elsewhere (in another slot, in the same or different chassis) the CLI Server may not be updated since there is already one running.

Referring now to FIGS. 6a and 6b, one example of the operation of the method of the system and method of the present invention is described. In FIG. 6a, a table 600 is shown before the system receives an image update for a board. The image includes a CLI server update. In FIG. 6b, the table 600 is shown after the system receives the image update. A section of memory 620 in FIG. 6a before the system receives the image update. The section of memory 620 is shown in FIG. 6b after the system receives the image update.

The table 600 includes a column 602, which indicates the chassis number. The table 600 also includes a column 604, which indicates the board or slot number. The table 600 also includes a column 606, which indicates a board type. The table 600 also includes a column 607, which indicates a board software version. The table 600 also includes a column 608, which indicates a CLI server version. The table 600 also includes a plurality of rows 610, 612, 614, and 616. Each row indicates for a particular chassis and board/slot number, the board type in the slot, the board software version in the slot, and the CLI server version used to process CLI commands intended for the board in the slot and chassis.

In FIG. 6a, the memory portion 620 includes a first section 622, second section 624, and third section 626. The first section 622 includes CLI executable code ("CLI server") CLI 1. The second section 624 includes CLI server CLI 2. The third section 626 includes CLI server CLI 3.

Before the update occurs and referring to FIG. 6a, the row 610 indicates that the board in chassis 1, slot 1 is of type A and relates to CLI server version CLI 1. The row 612 indicates that the board in chassis 1, slot 2 is of type A and relates to CLI server version CLI 1. The row 614 indicates that the board in chassis 1, slot 3 is of type B and relates to CLI server version CLI 2. The row 616 indicates that the board in chassis 2, slot 1 is of type C and relates to CLI server version CLI 3.

A image update may then occur, whereby a user may instruct the system to update the CLI server version for the board of type A in chassis 1, slot 1 with a new CLI server version CLI 4 and load a new software image to the boards. The system then inserts the new CLI server (CLI 4) into the table 620. Also, the system changes the entry in row 610, column 608 to reflect that future CLI commands involving board 1 in chassis 1 should use CLI server CLI 4. At this point, there are two versions of a CLI server for boards of the same type with different board software versions. Later when the software version of the chassis 1, slot 2 board is upgraded, the row 612 may be updated to reflect that the board in chassis 1, slot 2 should use CLI server version CLI 4. Afterward, the entry 622 can be erased and the memory space used for other purposes. In addition, the remaining part of the software image can be downloaded to the boards.

Figure 7:
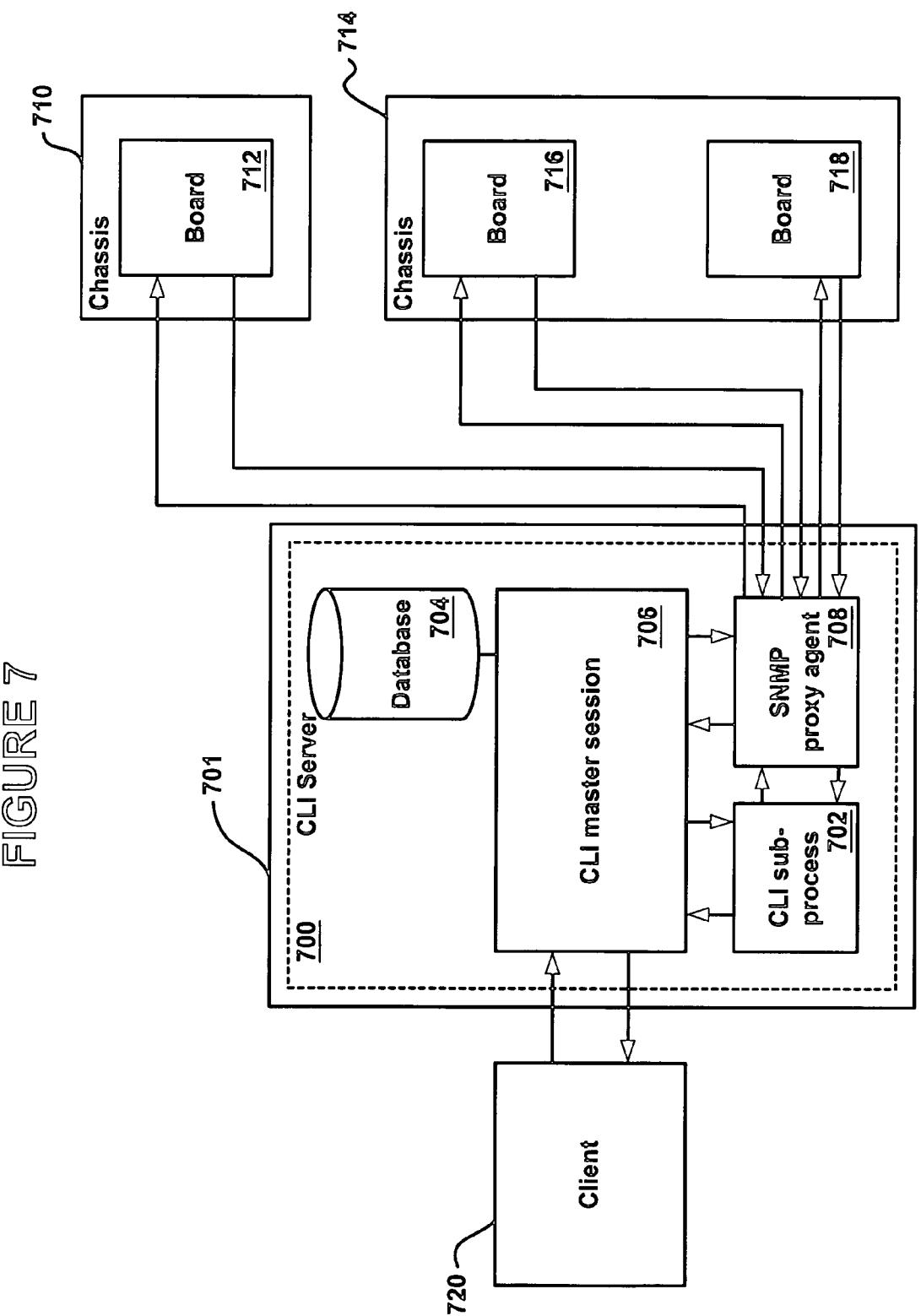
FIG. 7 is a block diagram of a CLI server process in accordance with a preferred embodiment of the present invention.

Referring now to FIG. 7, a CLI server 700 includes a CLI master session process 706, a plurality of CLI sub-processes 702, a database 704, and an SNMP proxy agent 708. The CLI master session process 706 is coupled to a plurality of CLI sub-processes 702, the database 704, and the SNMP proxy agent 708. The CLI server may reside on a System Manager board 701. A client process 720 is also coupled to the CLI master session 706 within the CLI server 700.

In addition, a chassis 710 includes a board 712. The board 712 is coupled to one of the CLI sub-processes 702 within the CLI server 700. All CLI sub-processes 702 communicate to their coupled boards through the SNMP proxy agent 708.

Also, a chassis 714 includes a board 716 and a board 718. The board 716 is coupled to different CLI sub-processes 702 depending on the board type and software version through the SNMP proxy agent 708. The CLI master session 706 may receive commands from the client 720, parse the commands, convert the commands into the SNMP protocol, and transmit the commands to the SNMP proxy agent 708. In addition, the CLI master session 706 may wait to receive an SNMP response from the SNMP proxy agent 708 and forward this response to the client 720. Further, the CLI master session may create a plurality of CLI sub-processes 702, for example, to forward a CLI command to the board 712 on the chassis 710 and boards 716 and 718 on chassis 714.

The CLI sub-process 702 may be created by the CLI master session 706 to forward CLI messages to the SNMP proxy agent 708 to get to any boards in the chassis 710 or 714. The CLI sub-process 702 may also receive response messages from the SNMP proxy agent 708.

The database 704 may store information concerning the various boards (e.g., boards 712, 716, and 718) and in which chassis (e.g. 710, or 714) the boards resides. The database 704 may also store the boardtype as well as the version. The database 704 may store any other type of information, as well.

SNMP proxy agent 708 may send any SNMP command to the various boards (e.g., boards 712, 716, and 718). The SNMP proxy agent 708 may also receive responses from the various boards (e.g., boards 712, 716, and 718).

The boards 712, 716, and 718 may be any type of board providing any type of functionality. The client 720 may be any process allowing a user to communicate with the CLI server 700.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for dynamic may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of processing commands comprising:

receiving a first software image comprising a first command line interface server and a first version of software for a board type, and storing the first command line interface server in a memory and downloading the first version of software to a first set of one or more boards of the board type, wherein the first command line interface server processes commands addressed to the first set of boards of the board type programmed with the first version of software;

receiving a second software image comprising a second command line interface server and a second version of software for the board type, and storing the second command line interface server in the memory and downloading the second version of software to a second set of one or more boards of the board type, wherein the second command line interface server processes commands addressed to the second set of boards of the board type programmed with the second version of software; and processing a first command using the first command line interface server and a second command using the second command line interface server, wherein the first command is addressed to the first set of boards of the board type programmed with the first version of software, and the second command is addressed to the second set of boards of the board type programmed with the second version of software, and wherein (i) processing the first command includes routing the first command to the first set of boards of the board type programmed with the first version of software, (ii) processing the second command includes routing the second command to the second set of boards of the board type programmed with the second version of software, and (iii) the memory concurrently stores the first command line interface server and the second command line interface server.

2. The method of claim 1 further comprising routing a single command to multiple boards using the first command line interface server.

3. The method of claim 1 wherein the first and second commands are CLI commands.

4. The method of claim 1 further comprising converting the first and second commands from a first protocol to a second protocol.

5. The method of claim 4 wherein the first protocol is CLI and the second protocol is SNMP.

6. A system manager, the system manager comprising:

a first coupling point coupled to a network management station, wherein the system manager receives from the network management station (i) a first software image comprising a first command line interface server and a first version of software for a board type, and (ii) a second software image comprising a second command line interface server and a second version of software for the board type;

a second coupling point coupled to a first set of one or more boards of the board type and to a second set of one or more boards of the board type, wherein the system manager downloads the first version of software to the first set of boards for programming the first set of boards with the first version of software and downloads the second version of software to the second set of boards for programming the second set of boards with the second version of software;

a memory for concurrently storing the first command line interface server and the second command line interface server, wherein the first command line interface server processes commands addressed to the first set of boards of the board type programmed with the first version of software, and the second command line interface server processes commands addressed to the second set of boards of the board type programmed with the second version of software;

a processor coupled to the memory, the processor for directing a first command to the first command line interface server and for directing a second command to the second command line interface server, wherein the first command is addressed to the first set of boards of the board type programmed with the first version of software, and the second command is addressed to the second set of boards of the board type programmed with the second version of software; and a proxy agent for (i) receiving the first command from the first command line interface server and routing the first command to the first set of boards of the board type programmed with the first version of software, and (ii) receiving the second command from the second command line interface server and routing the second command to the second set of boards of the board type programmed with the second version of software.

7. The system manager of claim 6 wherein the proxy agent receives commands addressed to multiple boards and routes the commands to the multiple boards.

8. The system manager of claim 6 wherein the commands are CLI commands.

9. The system manager of claim 6 wherein the commands are converted from a first format to a second format.

10. The system manager of claim 9 wherein the second format is SNMP.

11. A system for processing commands comprising:

means for receiving a first software image comprising a first command line interface server and a first version of software for a board type, and storing the first command line interface server in a memory and downloading the first version of software to a first set of one or more boards of the board type, wherein the first command line interface server processes commands addressed to the first set of boards of the board type programmed with the first version of software;

means for receiving a second software image comprising a second command line interface server and a second version of software for the board type, and storing the second command line interface server in the memory and downloading the second version of software to a second set of one or mole boards of the board type, wherein the second command line interface server processes commands addressed to the second set of boards of the board type programmed with the second version of software; and means for processing a first command using the first command line interface server and a second command using the second command line interface server, the first command addressed to the first set of boards of the board type programmed with the first software version, and the second command addressed to the second set of boards of the board type programmed with the second version of software, wherein (i) processing the first command includes routing the first command to the first set of boards of the board type programmed with the first version of software, (ii) processing the second command includes routing the second command to the second set of boards of the board type programmed with the second version of software, and (iii) the memory concurrently stores the first command line interface server and the second command line interface server.

12. The system of claim 11 further comprising means for routing a single command to multiple boards using the first command line interface server.

13. A computer readable medium having stored thereon instructions for causing a processing unit to:

receive a first software image comprising a first command line interface server and a first version of software for a board type, and storing the first command line interface server in a memory and downloading the first version of software to a first set of one or more boards of the board type, wherein the first command line interface server processes commands addressed to the first set of boards of the board type programmed with the first version of software;

receive a second software image comprising a second command line interface server and a second version of software for a board type, and storing the second command line interface server in a memory and downloading the second version of software to a second set of one or more boards of the board type, wherein the second command line interface server processes commands addressed to the second set of boards of the board type programmed with the second version of software, wherein the memory concurrently stores the first command line interface server and the second command line interface server;

route a first command, received at a master session process, to the first command line interface server, and route a second command, received at the master session process, to the second command line interface server, the first command being addressed to the first set of boards of the board type programmed with the first version of software, and the second command being addressed to the second set of boards of the board type programmed with the second version of software; and process the first command using the first command line interface server and the second command using the second command line interface server, wherein (i) processing the first command includes routing the first command to the first set of boards of the board type programmed with the first version of software, and (ii) processing the second command includes routing the second command to the second set of boards of the board type programmed with the second version of software.

14. A computer readable medium having stored therein instructions for causing a processing unit to execute the following method:
- receiving a first software image comprising a first command line interface server and a first version of software for a board type, and storing the first command line interface server in a memory and downloading the first version of software to a first set of one or more boards of the board type, wherein the first command line interface server processes commands addressed to the first set of boards of the board type programmed with the first version of software;
- receiving a second software image comprising a second command line interface server and a second version of software for the board type, and storing the second command line interface server in the memory and downloading the second version of software to a second set of one or more boards of the board type, wherein the second command line interface server processes commands addressed to the second set of boards of the board type programmed with the second version of software; and
- processing a first command using the first command line interface server and a second command using the second command line interface server, the first command addressed to the first set of boards of the board type programmed with the first version of software, and the second command addressed to the second set of boards of the board type programmed with the second version of software
- wherein (i) processing the first command includes routing the first command to the first set of of the board type programmed with the first version of software, (ii) processing the second command includes routing the second command to the second set of boards of the board type programmed with the second version of software, and (iii) the memory concurrently stores the first command line interface server and the second command line interface server.

15. A method of processing commands comprising:
- receiving a first software image comprising a first command line interface server and a first version of software for a board type, and storing the first command line interface server in a memory and downloading the first version of software to a first set of one or more boards of the board type, wherein the first command line interface server processes commands addressed to the first set of boards of the board type programmed with the first version of software;
- receiving a second software image comprising a second command line interface server and a second version of software for a board type, and storing the second command line interface server in a memory and downloading the second version of software to a second set of one or more boards of the board type, wherein the second command line interface server processes commands addressed to the second set of boards of the board type programmed with the second version of software;
- processing a first command using the first command line interface server and a second command using the second command line interface server, the first command addressed to the first set of boards of the board type programmed with the first version of software, and the second command addressed to the second set of boards of the board type programmed with the second version of software; and
- receiving, at the first command line interface server, a response from each of the boards of the first type having the first software version, and responsively forwarding each response to a master command line interface server, wherein the master command line interface server responsively sends a user response,
- wherein (i) processing the first command involves routing the first command to the first set of boards of the board type programmed with the first version of software, (ii) processing the second command involves routing the second command to the second set of boards of the board type programmed with the second version of software, and (iii) the memory concurrently stores the first command line interface server and the second command line interface server.

16. The system manager of claim 6, wherein the processor is arranged to include a command line interface server master session, wherein the command line interface server master session receives the first command and the second command from a client device, and wherein the command line interface master session directs (i) the first command to the first command line interface server, and (ii) the second command to the second command line interlace server.

17. The method of claim 15, further comprising routing a single command to multiple boards using the first command line interface server.

18. The method of claim 15, wherein the first and second commands are CLI commands.

19. The method of claim 15, further comprising converting the first and second commands from a first protocol to a second protocol.

20. The method of claim 19, wherein the first protocol is CLI and the second protocol is SNMP.

* * * * *